Patented Nov. 8, 1949

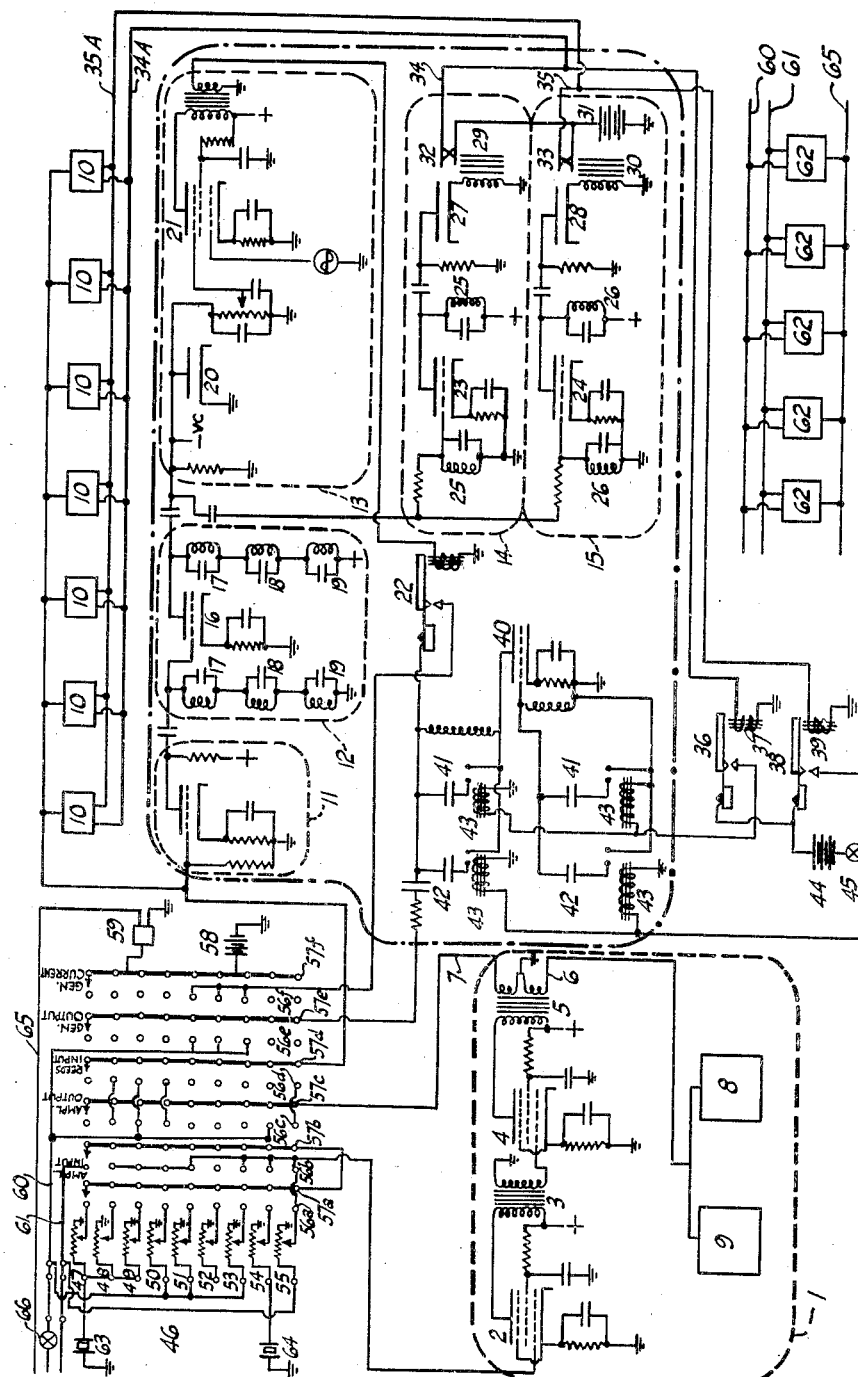

2,487,244

UNITED STATES PATENT OFFICE 2,487,244

MEANS FOR INDICATING SOUND PITCH OR VOICE INFLECTION

Gerard Michael Horvitch, Johannesburg, Transvaal, Union of South Africa

Application September 1, 1945, Serial No. 614,084
In the Union of South Africa September 23, 1944

6 Claims. (Cl. 35—35)

This invention relates to means for indicating sound pitch and voice inflection as used, for example, in speech training of deaf and dumb persons.

One object of the invention is to provide a pitch or inflection indicator which will be compact in form, convenient to use and economical to manufacture. Another object is to provide an indicator of this kind which can be readily adapted to indicate sound pitches or voice inflections on more than one octave.

According to one feature of the invention, I provide a pitch or inflection indicator which comprises the combination of means for converting sound or voice vibrations into electronic signals of corresponding frequency with means comprising a series of filters each adapted to pass a signal of predetermined frequency, means for transmitting said signals to these filters, a series of vibratory or depressible keys or reeds, and a series of devices each operative by a signal of predetermined frequency and each adapted to vibrate or depress a particular key or reed of which the vibration or depression will thereby be indicative of said signal.

More specifically, my pitch or inflection indicator comprises, in combination, electro-mechanical means for converting sound or voice vibrations into electronic signals of corresponding frequency, a series of filters each adapted to pass a signal of predetermined frequency, a matched impedance distributing and mixing network through which the said signals are transmitted to said filters, a series of vibratory or depressible keys or reeds, an electro-mechanical impulse generator operative by the frequency components of the signals to vibrate or depress the keys or reeds, the action of said keys or reeds being reversible to generate the frequency components equivalent to those causing them to react, indicators for determining the characteristics of the signals, and a switching device to follow the characteristics of the signals as they pass through the apparatus.

Preferably, the indicator comprises eight filters, key or reed-operating devices and keys or reeds, representative of a full octave of natural notes. When a sound or voice vibration or note corresponding to any one of the filters is transmitted to the indicator, the corresponding key or reed will vibrate strongly or be caused to be depressed. In use, the deaf and dumb person to be instructed will place the four fingers of each hand in order on the keys or reeds. The vibration or depression will be felt on the finger resting on the key or reed which is vibrated or depressed.

According to a further feature of the invention, I provide means whereby the one or more harmonics of the note admitted through each filter will also actuate the corresponding key or reed, and auxiliary indicating means for indicating, in respect of each note, and in combination with the key vibrated or depressed thereby, the particular harmonic so admitted. The said auxiliary indicating means may comprise depressible keys or reeds. Thus, to indicate the first harmonic above the basic reed notes, I may provide a depressible key or reed on which the thumb of, say, the left hand of the pupil may be placed. Another depressible key or reed may be provided on which the thumb of the right hand of the pupil may rest in order to indicate the second harmonic above the basic reed notes. Further, the third harmonic above the basic notes may be indicated to the pupil by arranging that in the case of harmonics in such third harmonic, the keys or reeds for both thumbs may be depressed together.

Preferably, the indicator is provided with means for indicating the intensity of sound, such as, for example, an audio voltage meter.

A preferred embodiment of the invention will now be described, by way of example, with reference to the accompanying drawings, in which:

Fig. 1 is a circuit diagram (partly diagrammatic) of a pitch indicator according to the invention.

Fig. 2 is a circuit diagram showing the manner in which a number of pitch indicators are connected to common lines for class use.

Referring to Fig. 1, the indicator comprises a master amplifier and distribution network 1, the input to which is fed through an amplifier 2 and thence through a coupling transformer 3 and an amplifier 4 to a transformer 5 which has two outputs, 6 and 7 respectively. The output 6 feeds a sound intensity indicator 8 and a slow speed wave form analyser 9 which provide a visual indication of the volume and wave characteristics appropriate to any frequency which may be passed into the unit 1.

In order to enable the frequencies appropriate to the eight notes of the basic octave and also the first and second harmonics of these notes to be converted into mechanical vibrations or movements which may be sensed by the fingers and distinguished one from the other, eight identical reed circuits are provided. Only one of these, namely that enclosed by the chain-dotted line, is shown in detail, the remainder being shown diagrammatically by 10. These reed circuits comprise an amplifier 11, a frequency selector and amplifier 12, a volume expanded amplifier 13 having a low frequency voltage to actuate the reed, and first and second harmonic selector units and reed actuators, 14 and 15 respectively. The amplifier 11 together with the line feeding the signals to it from contact 57d on the master switch constitutes a matched impedance distributing and mixing network, the function of which is to prevent interaction or interference between the filters 12 associated with the different reed circuits. The units 13, 14 and 15 together comprise an electro-mechanical impulse generator. The selector tube 16 is so designed as to be capable of selecting a single note in the filters 17, the first harmonic of that note in the filters 18 and the second harmonic in the filters 19. These three isolated selected notes are rectified in the rectifier 20 and control the amplifying power of the amplifier 21 which emits a frequency capable of best being conveyed by the reed 22.

The selector tube 16 also feeds the amplifiers 23 and 24 so that the filters 25 resonate to the first harmonic of the note generated and the filters 26 to the second harmonic. The rectifiers 27 and 28 feed the relays 29 and 30 respectively which, when actuated supply current from a source 31 through the contacts 32 and 33 via the leads 34, 35 to depress either the first harmonic reed 36 by means of the electro-magnetic locking device 37 or the second harmonic reed 38 by means of the locking device 39.

Since there are eight reed circuits, it will be understood that provision has been made for reproducing a full three-octave range, comprising the eight notes of the basic octave and the first and second harmonics of these notes. It is to be observed, however, that only two harmonic reeds, namely 36 and 38, are necessary to serve all eight reeds 22 of the basic octave since the leads 34a and 35a are all connected to the locking devices 37 and 39 respectively.

In order to enable frequencies to be generated by depressing the reeds, a generator 40 is provided for each of the reeds 22. The condensers 41 are adapted to change the frequency to the first harmonic when the first harmonic reed 36 is depressed, and the condensers 42 to change the frequency to the second harmonic when the second harmonic reed 38 is depressed. Current for actuating the relays 43 is supplied by the source 44 and a switch 45 is provided for bringing the harmonic reeds into circuit when they are required.

The indicator is controlled by means of a six pole, nine point, ganged mast switch shown diagrammatically at 46. The inputs to this switch are designated by the numerals 47—55 (which numerals are also used hereinafter to indicate the relative positions of the switch bar appropriate to the desired input), the switch contact points by 56a, 56b, 56c, 56d, 56e and 56f and the common poles by 57a, 57b, 57c, 57d, 57e and 57f.

The source of current supply is shown at 58, and 59 is an automatic switch selector control feeding an automatic selector line 65 and intercoupled to the master switch 46, by means of which operation of the master switch on one pitch indicator (e. g. the teacher's) will automatically cause the master switches on all the other indicators in the circuit to take up appropriate positions. As shown, the master switch 46 is connected to a class line 60 and a microphone line 61. A switch 66 is provided in the class line 60 and is inter-coupled with the bar of the master switch 46 so that when the said bar is at position 51, the class line is switched off from the generator output. In all other positions of the said bar the switch 66 remains on.

The automatic switch selector control 59 is of conventional design. Any of the commercially available types of mechanisms such as the solenoid and ratchet device in the dial mechanism of an automatic telephone can be employed to perform the function of actuating the pupils' master switches. The six pole, nine point, ganged master switches are likewise of conventional design.

Referring to Fig. 2, five pitch indicators 62 are shown connected to the class line 60, the microphone line 61, and the automatic selector line 65.

Pitch indicators, according to this invention are capable of being used in a variety of different ways and a number of examples will now be given.

1. *Teacher instructing a class through a microphone 63 but not using his own set to note the characteristics of his voice*

The teacher moves the bar of his master switch to position 47 and his microphone is then caused to feed directly into the microphone line 61. By means of the automatic selector control 59, the bars of the master switches on all the pupils' sets are caused to take up position 55.

The pupils place four fingers of each hand on the eight reeds covering the notes of the basic octave. The two thumbs are placed on the harmonic reeds. The teacher then generates a note through the microphone and the pupils are enabled to study the volume of that note by means of the sound intensity indicator, its characteristic wave form on the wave form analyser and, in addition, the reed appropriate to that note will vibrate and transmit its movement to the finger touching that reed, and if a harmonic is generated, the appropriate harmonic reed will depress.

Where a harmonic is generated, the identity of the actual harmonic note is, of course, indicated by the simultaneous vibration of the reed on which the pupil's finger (as distinct from his thumb) rests.

2. *Teacher instructing a class through his own microphone and his own set*

The teacher moves the bar of his master switch to position 49 and the pupil's master switches take up position 50. In this case the teacher can examine the characteristics of his own voice on his own set and, by reversing the position of the switches, can also examine the characteristics of the pupils' voices.

3. *Pupil examining his own speech*

The bar of the pupil's master switch is moved to position 48 and he is thus cut off from the rest of the class. On speaking into his microphone he is able to examine his speech on his reeds and instruments.

With the master switch in position 48 the pupil is cut off from all outside lines which would allow his set to interfere with the sets of other pupils or which would allow other sets to interfere with his own. The signals from his microphone are fed via poles 57a and 57b and the appropriate contact point 56b to the network 1, the output of which is fed via poles 57c and 57d to the amplifiers 11.

4. *Pupil generates notes on his reeds and examines their characteristics without interfering with the rest of the class*

The bar of the pupil's master switch is moved to position 51. Upon depressing any desired reed a frequency appropriate to that reed is generated by the generator 40 and the characteristics are examinable on the instruments. If it is desired to generate a harmonic of one of the basic notes, the appropriate harmonic reed is depressed in addition With the switch in position 51, current is supplied to generator 40 from source 58 through fixed pole 57f. When a reed is depressed, the generator output is fed via 57e through line 60, the appropriate contact point on 56a, poles 57a and 57b and the contact point on 56b into network 1. The pupil can thus examine the notes generated by him on the intensity indicator 8 and the analyser 9.

5. *Teacher generates notes on his reeds and the class examine their characteristics*

The teacher sets the bar of his master switch to position 52 and the pupils' master switches to position 50.

With the teacher's master switch in position 52 current is supplied from 57f to the teacher's generator, which in turn feeds into line 60 through 57e and 56e. The pupils' master switches being in position 50 pick up the signal from line 60 and feed it into the pupils' networks 1 through 56a, 57a, 57b and 56b. The output from networks 1 is then fed to amplifiers 11 via 57c, 56c, 56d and 57d.

6. *Teacher generates notes on his reeds and he and the class examine their characteristics*

The teacher sets the bar of his master switch to position 53 and the pupils' master switches to position 50.

With the teacher's master switch in position 53, current is supplied to the teacher's generator from source 58 through fixed pole 57f. The generator output is fed into line 60 via 57e and 56e. Line 60 is connected to 56a on the teacher's master switch whence the signals generated by the teacher are fed via 57b, 57a and 56b to his own network 1 so that he can examine their characteristics. Since the pupils' master switches are in position 50 as in Example 5, the signals are also fed into the pupils' networks 1 and amplifiers 11, enabling the pupils to examine any signals, both visually at indicator 8 and analyser 9 and by touching the keys or reeds.

7. *Teacher instructs through amplifier only without using his reeds*

The teacher sets his master switch to position 54 and the pupils' master switches to position 50. The teacher uses the microphone 64.

With the teacher's switch in position 54 the microphone 64 feeds into network 1 via 56a, 57a, 57b and 56b. The output of the amplifiers 2 and 4 is supplied to line 60 via 57c and 56c. The conditions in the pupils' sets with master switches 46 in position 50 are the same as in Examples 5 and 6 so that the pupils can examine the quality of the tones generated by the teacher at the microphone 64.

Various modifications may be made in the indicator described without departing from the scope of the invention. For example, instead of the harmonics above the basic octave being indicated by vibrators, I may provide for these harmonics to be indicated by one, two or more lamps common to all the keys or reeds of the basic octave and adapted to be illuminated or operated by the first, second or further harmonic of any of the notes within the basic octave. Thus, any note within, say, the first harmonic of the basic octave will actuate the same key or reed as the corresponding basic note but will also illuminate one lamp, say, a red lamp. This will give a range of two octaves. With a second lamp, say, a green lamp, to register a third octave, the full range of normal voice inflection can be indicated.

I claim:

1. A pitch indicator comprising, in an electrical circuit, electro-mechanical means for converting sound vibrations into electronic signals of corresponding frequency; a series of filters each capable of passing a signal of predetermined and different frequency, a matched impedance distributing and mixing network through which said signals are transmitted to said filters, a series of vibratory or depressible reeds or keys, and a series of electro-mechanical impulse generators each operative by a signal of predetermined and different frequency and each adapted to cause vibration or depression of a particular reed or key, the vibration or depression whereof is indicative of the frequency of said signal, and means for transmitting the signals from said filters to said generators and from said generators to said reeds or keys.

2. A pitch indicator comprising, in an electrical circuit, electro-mechanical means for converting sound vibrations into electronic signals of corresponding frequency, a series of filters each capable of passing a signal of predetermined and different frequency, a matched impedance distributing and mixing network through which said signals are transmitted to said filters; a series of vibratory or depressible reeds or keys; a series of electro-mechanical impulse generators each operative by a signal of predetermined and different frequency and each adapted to cause vibration or depression of a particular reed or key the vibration or depression whereof is indicative of the frequency of said signal, the action of said reeds or keys being reversible when required to generate the frequency components equivalent to those causing them to react; means for transmitting the signals from said filters to said generators and from said generators to said reeds or keys; indicators for determining the characteristics of said signals; and switch means to follow the characteristics of said signals as they pass through the apparatus.

3. A pitch indicator comprising, in an electrical circuit, electro-mechanical means for converting sound vibrations into electronic signals of corresponding frequency, a series of eight filters each capable of passing a signal of predetermined and different frequency, a matched impedance distributing and mixing network through which said signals are transmitted to said filters, a series of eight vibratory or depressible reeds or keys, a series of eight electro-mechanical impulse generators each operative by a signal of predetermined and different frequency and each adapted to cause vibration or depression of a particular reed or key the vibration or depression whereof is indicative of the frequency of said signal, the action of said reeds or keys being reversible when required to generate the frequency components equivalent to those causing them to react, means for transmitting the signals from said filters to said generators and from said generators to said reeds or keys, visual indicators for determining the characteristics of said signals, and switch means to follow the characteristics of said signals as they pass through the apparatus.

4. A pitch indicator comprising, in an electrical circuit, electro-mechanical means for converting sound vibrations into electronic signals of corresponding frequency; a series of eight filters each capable of passing a basic signal of predetermined and different frequency; filter means capable of passing signals of frequencies corresponding to the harmonics of the aforesaid basic signals; a matched impedance distributing and mixing network through which said signals are transmitted to said filters; a series of eight vibratory or depressible reeds or keys; vibratory or depressible reed or key means for indicating the harmonics of the basic signals; a series of eight electro-mechanical impulse generators each operative by a signal of predetermined and different frequency and each adapted to cause vibration or depression of a particular reed or key and, in the case of a harmonic of one of the basic signals being admitted, also to cause vibration or depression of the appropriate harmonic reed or key, the action of said reeds or keys being reversible when required to generate the frequency components equivalent to those causing them to react; means for transmitting the signals from said filters to said generators and from said generators to said reeds or keys; visual indicators for determining the characteristics of said signals; and switch means to follow the characteristics of said signals as they pass through the apparatus.

5. A pitch indicator, according to claim 4, in which two harmonic reeds or keys are provided thus enabling the indicator to cover a three-octave range.

6. A pitch indicator comprising, in an electrical circuit, electro-mechanical means for converting sound vibrations into electronic signals of corresponding frequency; a series of eight basic filters each capable of passing a basic signal of predetermined and different frequency; filter means capable of passing signals of frequencies corresponding to the harmonics of the aforesaid basic signals; a matched impedance distributing and mixing network through which said signals are passed to said filters; a series of eight vibratory or depressible reeds or keys for indicating the basic signals; two vibratory or depressible reeds or keys for indicating the first and second harmonics respectively of the basic signals; a series of eight volume-expanded low frequency amplifiers each operative by a basic signal of predetermined and different frequency and each adapted to cause vibration or depression of a particular reed or key; a series of eight pairs of harmonic selector units whose outputs are coupled to actuate the harmonic reed or key appropriate to the signal admitted, means for transmitting said signals from said basic filters to said low frequency amplifiers and from said amplifiers to said eight reeds or keys; means for transmitting said harmonic signals from said filter means to said harmonic selector units and from said selector units to said two harmonic reeds or keys, the action of all reeds or keys being reversible to generate the frequency components equivalent to those causing them to react; visual indicators for determining the characteristics of said signals; and switch means to follow the characteristics of said signals as they pass through the apparatus.

GERARD MICHAEL HORVITCH.

REFERENCES CITED

The following references are of record in the file of this patent:

UNITED STATES PATENTS

| Number | Name | Date |
| --- | --- | --- |
| 1,733,605 | Jones | Oct. 29, 1929 |
| 1,738,289 | Fletcher | Dec. 3, 1929 |
| 1,835,778 | Huenlich | Dec. 8, 1931 |
| 2,137,888 | Fuller | Nov. 22, 1938 |
| 2,152,955 | Coyne | Apr. 4, 1939 |
| 2,212,431 | Bly | Aug. 20, 1940 |
| 2,368,953 | Walsh | Feb. 6, 1945 |
| 2,388,531 | Deal | Nov. 6, 1945 |
| 2,416,353 | Shipman | Feb. 25, 1947 |
| 2,432,123 | Potter | Dec. 9, 1947 |

OTHER REFERENCES

The Story of My Life, Helen Keller, School Edition by Eleanore Pollak, Ottendorft, Houghton Mifflin Co., 1928, pages 57 and 60.